(12) United States Patent  
Satomi

(10) Patent No.: US 7,689,692 B2  
(45) Date of Patent: Mar. 30, 2010

(54) METHOD OF ARRANGING DIALOGUE TYPE SERVICE THROUGH INTERACTIVE SERVICE SYSTEM

(75) Inventor: Mitsunori Satomi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1522 days.

(21) Appl. No.: 10/964,628

(22) Filed: Oct. 15, 2004

(65) Prior Publication Data

US 2006/0031562 A1   Feb. 9, 2006

(30) Foreign Application Priority Data

Jun. 9, 2004   (JP) ............................. 2004-171737

(51) Int. Cl.
   *G06F 15/173*   (2006.01)

(52) U.S. Cl. ..................... 709/225; 709/223

(58) Field of Classification Search ................ 709/200, 709/213, 224, 236, 219, 226, 225, 223; 370/270, 370/465, 477, 351–358, 526, 395; 310/26–28; 713/201

See application file for complete search history.

(56) References Cited

U.S. PATENT DOCUMENTS 5,548,726 A * 8/1996 Pettus ........................ 709/221
6,006,264 A * 12/1999 Colby et al. ................ 709/226
2002/0002600 A1 * 1/2002 Yamada et al. ............. 709/219
2004/0068586 A1 * 4/2004 Xie et al. .................... 709/246

FOREIGN PATENT DOCUMENTS

| JP | 10-74159 | 3/1998 |
| JP | 2002-183106 | 6/2002 |
| JP | 2002-342296 | 11/2002 |
| JP | 2004-54448 | 2/2004 |
| WO | WO09811482 | 3/1998 |
| WO | 2004/023757 | 3/2004 |

* cited by examiner

*Primary Examiner*—Nathan Flynn  
*Assistant Examiner*—Mark O Afolabi  
(74) *Attorney, Agent, or Firm*—Mattingly & Malur, P.C.

(57) ABSTRACT

A computer system executes a procedure by which a service broker accepts registration of interactive service; executes a procedure by which the service broker accepts a request from a client terminal to provide the interactive service; executes a procedure by which the service broker selects servers allowed to provide resources requested by the interactive service as candidates for the destination of arrangement of the interactive service; executes a procedure by which the service broker specifies a server as the destination of arrangement of the interactive service from the candidates for the destination of arrangement on the basis of the provision quality of the interactive service between each server and the client terminal; and executes a procedure by which the service broker arranges the interactive service stored in a memory, in the specified server.

10 Claims, 10 Drawing Sheets

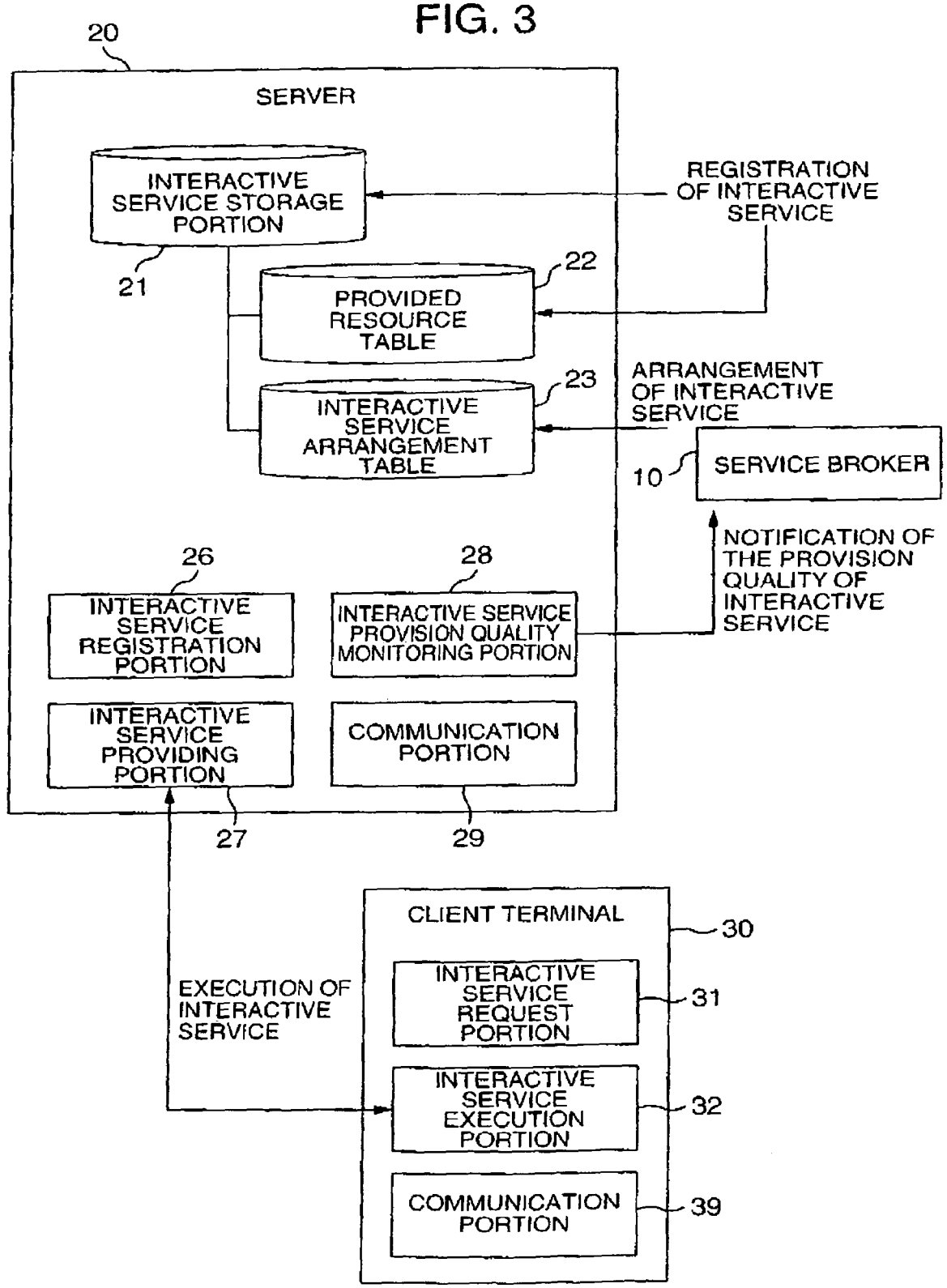

FIG. 4A

INTERACTIVE SERVICE STORAGE PORTION 11 | REQUEST RESOURCE TABLE 12

| INTERACTIVE SERVICE | EXECUTION PROGRAM | EXECUTION DATA | REQUEST PROGRAM FORMAT | REQUEST THROUGHPUT | REQUEST MEMORY CAPACITY | REQUEST DISK CAPACITY | ASSUMED USER |
|---|---|---|---|---|---|---|---|
| INFORMATION RETRIEVAL (ID = 100) | search. exe | index. txt | WIN32 | 100 MIPS | 10 MB | 100 MB | REGION A |
| BOOKSELLING (ID = 200) | /bin/buy | items. txt | UNIX | 10 MIPS | 5 MB | 10 MB | ALL USERS |
| ⋮ | ⋮ | ⋮ | ⋮ | ⋮ | ⋮ | ⋮ | ⋮ |

↕ DECIDE SERVERS IN WHICH INTERACTIVE SERVICES MUST BE ARRANGED RESPECTIVELY BY COLLATING RESOURCES (FIG. 4A) REQUESTED BY THE INTERACTIVE SERVICES WITH RESOURCES (FIG. 4B) PROVIDED BY THE SERVERS

FIG. 4B

PROVIDED RESOURCE TABLE 22

| SERVER | STATIC INFORMATION | DYNAMIC INFORMATION | | | |
|---|---|---|---|---|---|
| | EXECUTABLE PROGRAM FORMAT | OPERATING STATE | ALLOCATABLE THROUGHPUT | ALLOCATABLE MEMORY CAPACITY | ALLOCATABLE DISK CAPACITY |
| SERVER A (ID = 201) | FORMAT A | OPERATING | 1000 MIPS | 100 MB | 1000 MB |
| SERVER B (ID = 202) | FORMAT A, FORMAT B | OPERATING | 800 MIPS | 5 MB | 200 MB |
| SERVER C (ID = 203) | FORMAT B | OPERATING | 1000 MIPS | 100 MB | 1000 MB |
| ⋮ | ⋮ | ⋮ | ⋮ | ⋮ | ⋮ |

FIG. 5A

INTERACTIVE SERVICE ARRANGEMENT TABLE 13
OR INTERACTIVE SERVICE ARRANGEMENT TABLE 23

| INTERACTIVE SERVICE | EXECUTION PROGRAM | EXECUTION DATA | SERVER AS DESTINATION OF ARRANGEMENT | STATE |
|---|---|---|---|---|
| INFORMATION RETRIEVAL (ID=100) | search. exe | index. txt | SERVER A | RUNNING |
| BOOKSELLING (ID=200) | /bin/buy | items. txt | SERVER B | STOPPED |
| ⋮ | ⋮ | ⋮ | ⋮ | ⋮ |

FIG. 5B

INTERACTIVE SERVICE PROVISION QUALITY TABLE 14

| SERVER | CLIENT TERMINAL | | |
|---|---|---|---|
| | REGION A | REGION B | REGION C |
| SERVER A (ID = 201) | 100 ms | 500 ms | 1000 ms |
| SERVER B (ID = 202) | 500 ms | 100 ms | 500 ms |
| SERVER C (ID = 203) | 1000 ms | 500 ms | 100 ms |
| ⋮ | ⋮ | ⋮ | ⋮ |

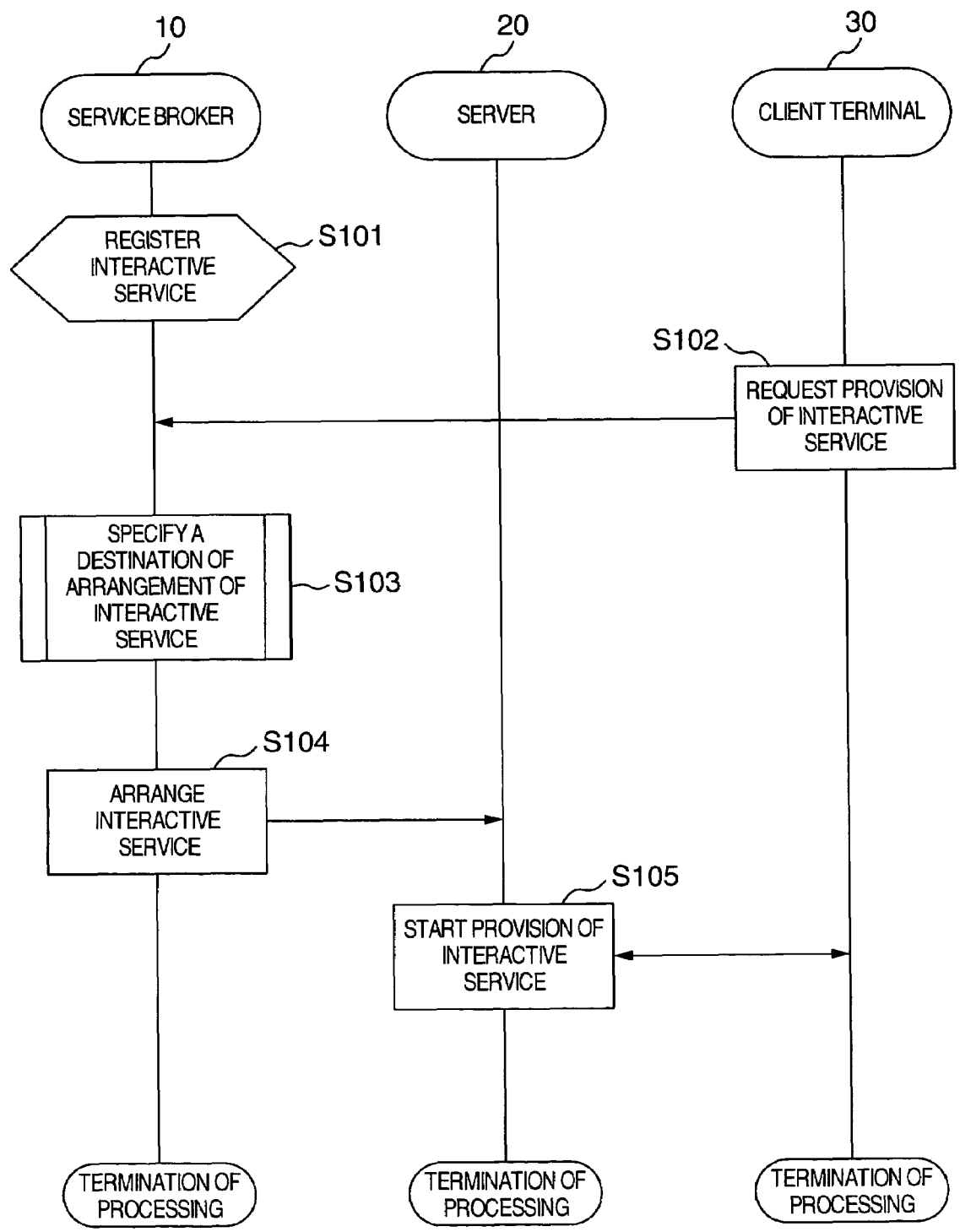

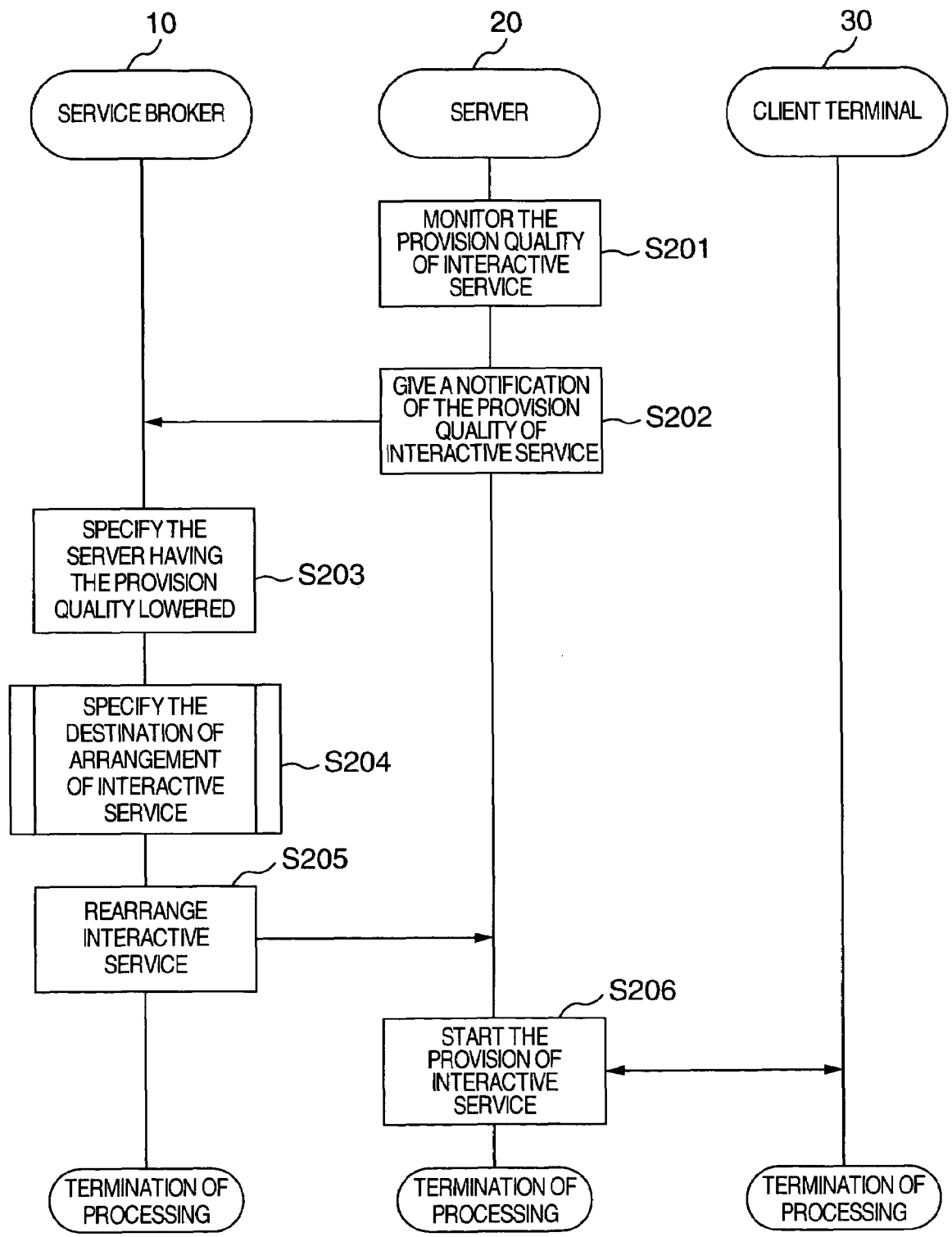

METHOD OF ARRANGING DIALOGUE TYPE SERVICE THROUGH INTERACTIVE SERVICE SYSTEM

BACKGROUND OF THE INVENTION

The present invention relates to a method of arranging interactive service, a program of arranging interactive service, a recording medium for storing the program and a service broker.

A system in which a certain computer entrusts (arranges) a predetermined process to another computer is known widely. For example, according to JP-A-2004-38972, in a plurality of servers (described as "work stations" in JP-A-2004-38972) connected to one another by a network, a process unit (described as "grid calculation work load" in JP-A-2004-38972) is arranged on the basis of internal information of the servers such as frequencies in use.

According to JP-A-2004-38972, processing is performed in such a manner that a broker (described as "grid" in JP-A-2004-38972) selects a server allowed to execute the process unit on the basis of the processing capacity necessary for execution of the process unit and arranges the process unit in the selected server.

In the background art described in JP-A-2004-38972, when a process unit mainly including a numerical calculation process such as an arithmetic process is provided as a subject, the process unit can be executed by only processing in the inside of a server. Accordingly, the broker entrusting a process can allocate an appropriate server on the basis of information concerning the internal state of each server.

Incidentally, a service providing process is carried out between a server providing a service and a client receiving the service. Interactive service is the form of provision of service in which request messages and reply messages concerning service are transmitted and received frequently (several times) between a server and a client.

On the other hand, batch processing service is the form of provision of service in which the client's entrusting of service to a server is performed once collectively and in which the server's provision of service to a client is performed once collectively. The batch processing service is distinguished from the interactive service.

Accordingly, the interactive service is different from the batch processing service in that data concerning service are exchanged frequently between a server and a client. In the interactive service, the client's environment such as the quality of communication between the server and the client has a large influence on the provision quality of service.

Accordingly, when a process unit is used not for mainly performing numerical calculation but for providing interactive service (e.g. information retrieval service) to an end user, a problem occurs. That is, the background art has a problem that a server for providing service of an appropriate quality to an end user cannot be selected because there is no consideration for the end user using the interactive service when a server in which a process unit is arranged for providing interactive service is selected.

For example, assume that servers for achieving one information retrieval service are located in Tokyo and Osaka when a predetermined information retrieval service needs to be executed from a terminal located in Chiba. In this case, it is preferable that the server located in Tokyo is selected from the point of view of a small network delay. The server located in Osaka, however, may be selected. If the server located in Osaka is selected, convenience is lowered because the terminal located in Chiba receives service of a low quality (large network delay).

SUMMARY OF THE INVENTION

Therefore, a chief object of the present invention is to arrange interactive service in a server appropriate to an end user to thereby solve the problem in the background art.

To solve the foregoing problem, the invention provides a method of arranging interactive service by a interactive service system including a service broker, severs, and client terminals, the service broker being provided for arranging the interactive service in the servers, the servers being provided for executing the interactive service for the client terminals, each of the service broker and the servers at least having a memory as a storage region used for performing an arithmetic process, and a processor for performing the arithmetic process, the method including the steps of: executing a procedure by which the service broker accepts registration of the interactive service; executing a procedure by which the service broker accepts a request from one of the client terminals to provide the interactive service; executing a procedure by which the service broker selects servers allowed to provide resources requested by the interactive service as candidates for the destination of arrangement of the interactive service; executing a procedure by which the service broker specifies a server as the destination of arrangement of the interactive service from the candidates for the destination of arrangement on the basis of the provision quality of the interactive service between each server and the client terminal; and executing a procedure by which the service broker arranges the interactive service stored in the memory, in the specified server.

BRIEF DESCRIPTION OF THE DRAWINGS

FIG. 3 is a diagram showing a server and a client terminal according to an embodiment of the invention;

FIGS. 4A and 4B are views showing the format of data storage concerning interactive service according to an embodiment of the invention;

FIGS. 5A and 5B are views showing the format of data storage concerning provision of interactive service according to an embodiment of the invention;

FIG. 6 is a flow chart showing a process of allocating interactive service according to an embodiment of the invention;

FIG. 7 is a flow chart showing a process of re-allocating interactive service according to an embodiment of the invention;

DETAILED DESCRIPTION OF EMBODIMENTS

An embodiment of a interactive service system to which the invention is applied will be described below in detail with reference to the drawings. First, the configuration of the interactive service system according to this embodiment will be described with reference to FIGS. 1 to 3, FIGS. 4A and 4B and FIGS. 5A and 5B.

Figure 1:
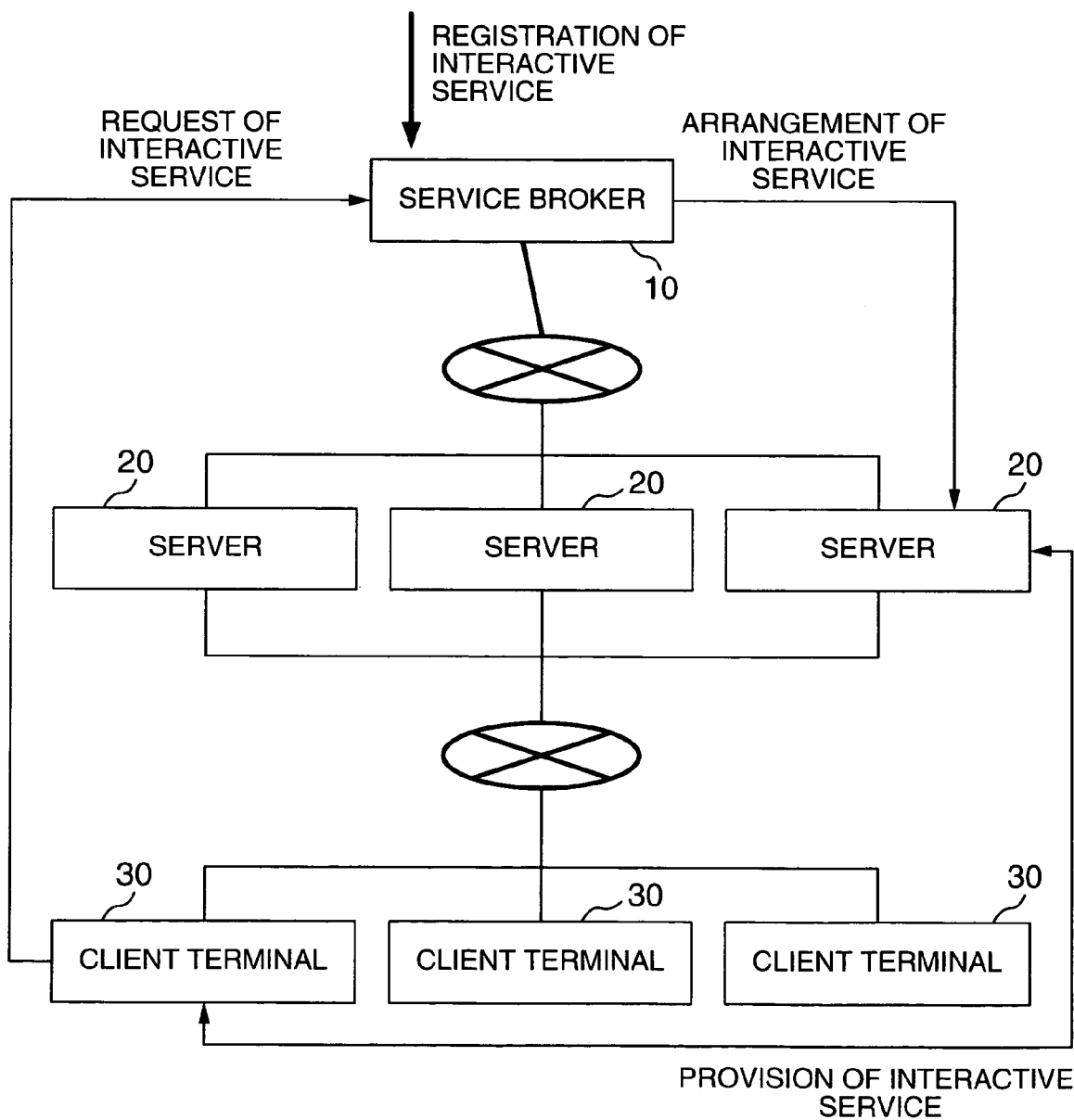
FIG. 1 is a configuration diagram of a interactive service system according to an embodiment of the invention.

FIG. 1 is a configuration diagram of a interactive service system. The interactive service system includes a service broker 10, servers 20, and client terminals 30. The service broker 10, the servers 20 and the client terminals 30 are connected to one another by a network. The service broker 10 arranges programs of execution of interactive service in the servers 20. The servers 20 execute the programs of execution of interactive service arranged by the service broker 10 for the client terminals 30. The client terminals 30 execute interactive service with respect to the servers 20. Incidentally, interactive service is registered in the service broker 10 by a interactive service provider.

Figure 2:
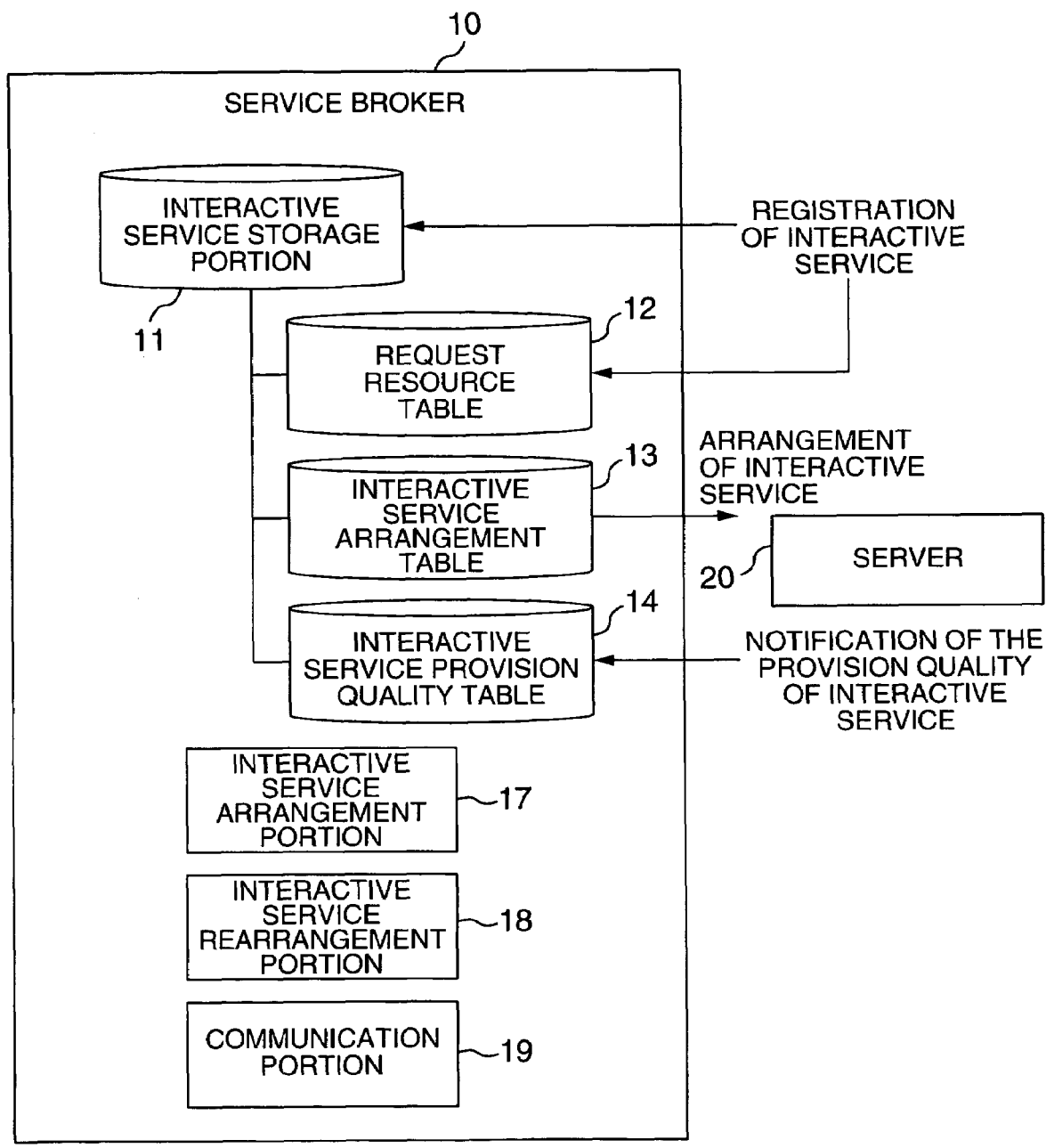
FIG. 2 is a diagram showing a service broker according to an embodiment of the invention.

FIG. 2 is a diagram showing the service broker 10. The service broker 10 includes a interactive service storage portion 11, a request resource table 12, a interactive service arrangement table 13, and a interactive service provision quality table 14. The interactive service storage portion 11, the request resource table 12, the interactive service arrangement table 13 and the interactive service provision quality table 14 are stored in storage means of the service broker 10. Programs of execution of interactive service are stored in the interactive service storage portion 11. Information of resources requested by the interactive service at the time of execution is stored in the request resource table 12. The interactive service arrangement table 13 is used for managing destinations (servers 20) of arrangement of the interactive service. The interactive service provision quality table 14 is used for managing quality provided by the interactive service. The service broker 10 further includes a interactive service arrangement portion 17, and a interactive service rearrangement portion 18. The interactive service arrangement portion 17 and the interactive service rearrangement portion 18 are provided by arithmetic means of the service broker 10. The interactive service arrangement portion 17 arranges interactive service in the servers 20. The interactive service rearrangement portion 18 rearranges the arranged interactive service in accordance with the quality provided by the interactive service.

FIG. 3 is a diagram showing a server 20 and a client terminal 30. The server 20 includes a interactive service storage portion 21, a provided resource table 22, a interactive service arrangement table 23, and a interactive service registration portion 26. The interactive service storage portion 21, the provided resource table 22, the interactive service arrangement table 23 and the interactive service registration portion 26 are stored in storage means of the server 20. A program of execution of interactive service is stored in the interactive service storage portion 21. Information of resources provided for the interactive service at the time of execution is stored in the provided resource table 22. The interactive service arrangement table 23 is used for managing the source (service broker 10) of arrangement of the interactive service. The interactive service arranged by the service broker 10 is registered in the interactive service registration portion 26 so that the interactive service can be provided. The server 20 further includes a interactive service providing portion 27, and a interactive service provision quality monitoring portion 28. The interactive service providing portion 27 and the interactive service provision quality monitoring portion 28 are provided by arithmetic means of the server 20. The interactive service providing portion 27 provides the interactive service to the client terminal 30. The interactive service provision quality monitoring portion 28 monitors the provision quality of the interactive service.

The interactive service provision quality monitoring portion 28 monitors information of the inside of the server 20 (the loading state of a CPU, the utilization ratio of a memory, the empty state of a hard disk, etc.) and the state of communication between the interactive service executed by a service execution portion and the client terminal 30. The server 20 transmits the monitored information to the service broker 10.

The client terminal 30 includes a interactive service request portion 31, and a interactive service execution portion 32. The interactive service request portion 31 requests the service broker 10 to provide interactive service. The interactive service execution portion 32 executes the interactive service with respect to the server 20.

The apparatuses (10, 20 and 30) in the interactive service system include communication portions 19, 29 and 39 respectively. The communication portion 19, 29 or 39 of one apparatus serves as an interface for processing data communication with the other apparatuses.

FIGS. 4A and 4B are views showing the format of data storage with respect to interactive service. The interactive service system collates resources (FIG. 4A) requested by the interactive services with resources (FIG. 4B) provided by the servers 20 to thereby decide the servers 20 in which the interactive services must be arranged respectively.

FIG. 4A shows the configuration of the interactive service storage portion 11 and the request resource table 12. The interactive service storage portion 11 stores correspondences among identification information of interactive service, execution program and execution data (data necessary for execution).

The request resource table 12 stores information concerning execution program format, request throughput, request memory capacity, request disk capacity and assumed user while associating the information with the interactive services. The execution program format indicates a format (e.g. WIN32) necessary for execution of the execution program. The request throughput indicates the throughput (e.g. 100 MIPS (Million Instructions Per Second)) of the server 20 necessary for execution of the execution program. The request memory capacity indicates the memory capacity (e.g. 10 MB (Mega-Bytes)) necessary for execution of the execution program. The request disk capacity indicates the disk capacity (e.g. 100 MB) necessary for execution of the execution program. The assumed user in the request resource table 12 indicates that use by a user, for example, in the region A is assumed.

FIG. 4B shows the configuration of the provided resource table 22. The provided resource table 22 is used for managing information specific to the servers 20. Incidentally, the specific information can be classified into dynamic information and static information. The dynamic information changes with the passage of time whereas the static information does not change with the passage of time.

First, the static information in the provided resource table 22 is, for example, executable program format. The executable program format indicates the format of the execution program that can be executed by the server 20. The executable program format is defined on the basis of an OS (Operating System) or programming language (C language, etc.) under which the program can operate. For example, the value "format A, format B" written in the "executable program format" column in FIG. 4B indicates that both execution programs of format A and format B can be executed in the service execution portion of the server B. Although this embodiment has shown the case where only the executable program format of each server 20 is provided as an attribute, other attributes such as the strength of security of each server 20 per se, and the kind of security protocol supported by communication with the outside may be added to the provided resource table 22. The ID of each server 20 is identification information specific to each server 20.

Next, the dynamic information in the provided resource table 22 includes operating state, allocatable throughput, allocatable memory capacity, and allocatable disk capacity. The operating state indicates whether the server 20 as a subject is operating or not. The allocatable throughput, the allocatable memory capacity and the allocatable disk capacity indicate resources of the computer environment that can be used in the server 20 as a subject when a interactive service is allocated newly. These pieces of information in the provided resource table 22 are used when information of each server 20 per se is detected by the interactive service provision quality monitoring portion 28 of the server 20 and sent to the service broker 10.

FIGS. 5A and 5B are views showing the format of data storage with respect to provision of interactive service.

FIG. 5A shows the interactive service arrangement table 13 or 23. The interactive service ID in the interactive service storage portion 11 or 21 is identification information specific to the interactive service to be arranged by the service broker 10 (FIG. 2) on the basis of a request. The interactive service ID is given by the service broker 10. The state indicates the state of the interactive service. At the point of time when the interactive service is registered, the state is set as "non-arranged" because the interactive service has been not arranged yet. For example, information retrieval service (ID=100) is arranged in the server A and is running. The execution program used in the information retrieval service (ID=100) is "search.exe". The execution data used in the information retrieval service (ID=100) is "index.txt". The assumed user is information for indicating the user characteristic of the client terminal 30 selected preferentially at the time of selection of the client terminal 30 (FIG. 3) for the interactive service.

FIG. 5B shows the interactive service provision quality table 14. For example, the interactive service provision quality table 14 is provided so that the average network response time between each server 20 and the region (region A, region B or region C) where the client terminal 30 is present is recorded. For example, the value of 100 ms in the cell as a point of intersection between the server A and the region A indicates that the average time of 100 ms is required for communication between the server A and the client terminal 30 located in the region A through the network. Incidentally, the average network response time is only an example of yardstick for indicating the provision quality of the interactive service. Another yardstick (such as network bandwidth) may be managed in the interactive service provision quality table 14.

The configuration of the interactive service system has been described above. Next, the operation of the interactive service system according to this embodiment will be described on the basis of FIGS. 6 to 9 with reference to FIGS. 1 to 3, FIGS. 4A and 4B and FIGS. 5A and 5B.

FIG. 6 is a flow chart showing a process of allocating interactive service.

First, the service broker 10 registers interactive service in a server 20 (S101). First, the service provider for providing interactive service to a client terminal 30 requests the service broker 10 to arrange the interactive service. Then, the service broker 10 accepts registration of a program for achieving the interactive service from the service provider and stores the program in the interactive service storage portion 11. The program stored in the interactive service storage portion 11 is provided so that the interactive service executed between the server 20 and the client terminal 30 can fulfill its function.

Then, the client terminal 30 requests the service broker 10 to provide the interactive service (S102). The service broker 10 specifies the destination of arrangement of the interactive service (S103).

Then, the service broker 10 arranges the interactive service in the server 20 specified by the step S103 (S104). The term "arrangement" means copying the execution program and the execution data. A result of the arrangement is stored in the interactive service arrangement table 23. For example, the state "running" in FIG. 5A indicates that the interactive service arranged is being executed by the server 20.

Then, the server 20 starts the provision of the interactive service to the client terminal 30 (S105). The interactive service providing portion 27 and the interactive service executing portion 32 cooperate with each other to thereby execute the interactive service.

The process of allocating interactive service has been described above briefly. Next, a process of re-allocating the interactive service which has been already allocated to the server 20 will be described. After the interactive service gets into a steady-state operating state, assessment of the service quality provided by the interactive service is made periodically.

For example, assume that the first server 20 provides interactive service to users in three regions (region A, region B and region C) simultaneously. Then, there occurs a problem that the quality of the provided service is lowered because of the convergence of the network, or the like. Therefore, the user in one of the three regions (region A, region B and region C) allocated to the first server 20, for example, the user in region B is re-allocated to the second server 20. The re-allocation can restrain the service quality from being lowered due to concentration of processing into a specific server 20.

FIG. 7 is a flow chart showing a process of re-allocating the interactive service.

Figure 8:
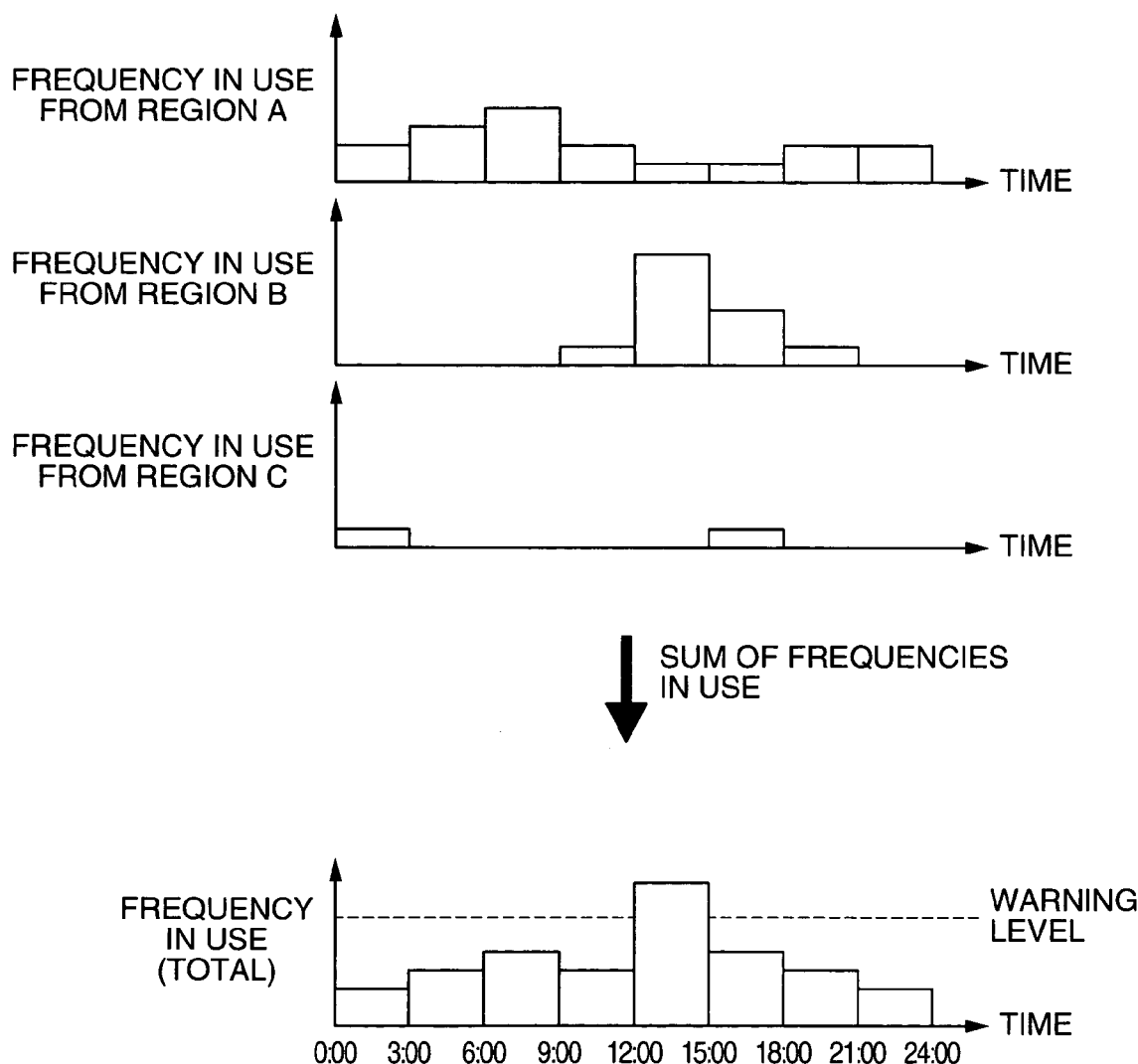
FIG. 8 is a view for explaining a process of monitoring the provision quality of interactive service according to an embodiment of the invention.

First, a server 20 monitors the provision quality of interactive service (S201). The interactive service provision quality monitoring portion 28 monitors and collects states (such as frequencies in use) of provision of service to client terminals 30, from the interactive service. FIG. 8 shows an example of the collected frequencies in use. The frequency histograms shown in FIG. 8 are expressed as histograms in which the frequencies in use based on access from all the client terminals 30 are separated according to the regions. In each histogram, the horizontal axis expresses time, and the vertical axis expresses access frequency. Each histogram indicates averages of access frequencies according to time zones in one day.

Then, the server 20 notifies the service broker 10 of the provision quality of the interactive service monitored by the step S201 (S202).

Incidentally, the apparatus for monitoring the provision quality of the interactive service is not limited to the server 20. For example, another apparatus such as each client terminal 30 may monitor the provision quality of the interactive service.

Then, the service broker 10 specifies a server 20 having the provision quality lowered (S203). For example, the service broker 10 checks whether some frequency in use shown in FIG. 8 indicates a level of access exceeding the warning level. When the level of access exceeds the warning level, the server 20 notifying the service broker 10 of the excessive frequency in use is regarded as a server 20 having the quality of service lowered.

Then, the service broker 10 specifies a server 20 as a destination of rearrangement of the interactive service which has been already arranged in the server 20 specified by the step S203 (S204). Then, the service broker 10 rearranges the interactive service in the server 20 specified by the step S204 (S205). The term "rearrangement" means copying or moving the execution program and the execution data. Then, the server 20 starts the provision of the interactive service to the client terminal 30 (S206).

Figure 9:
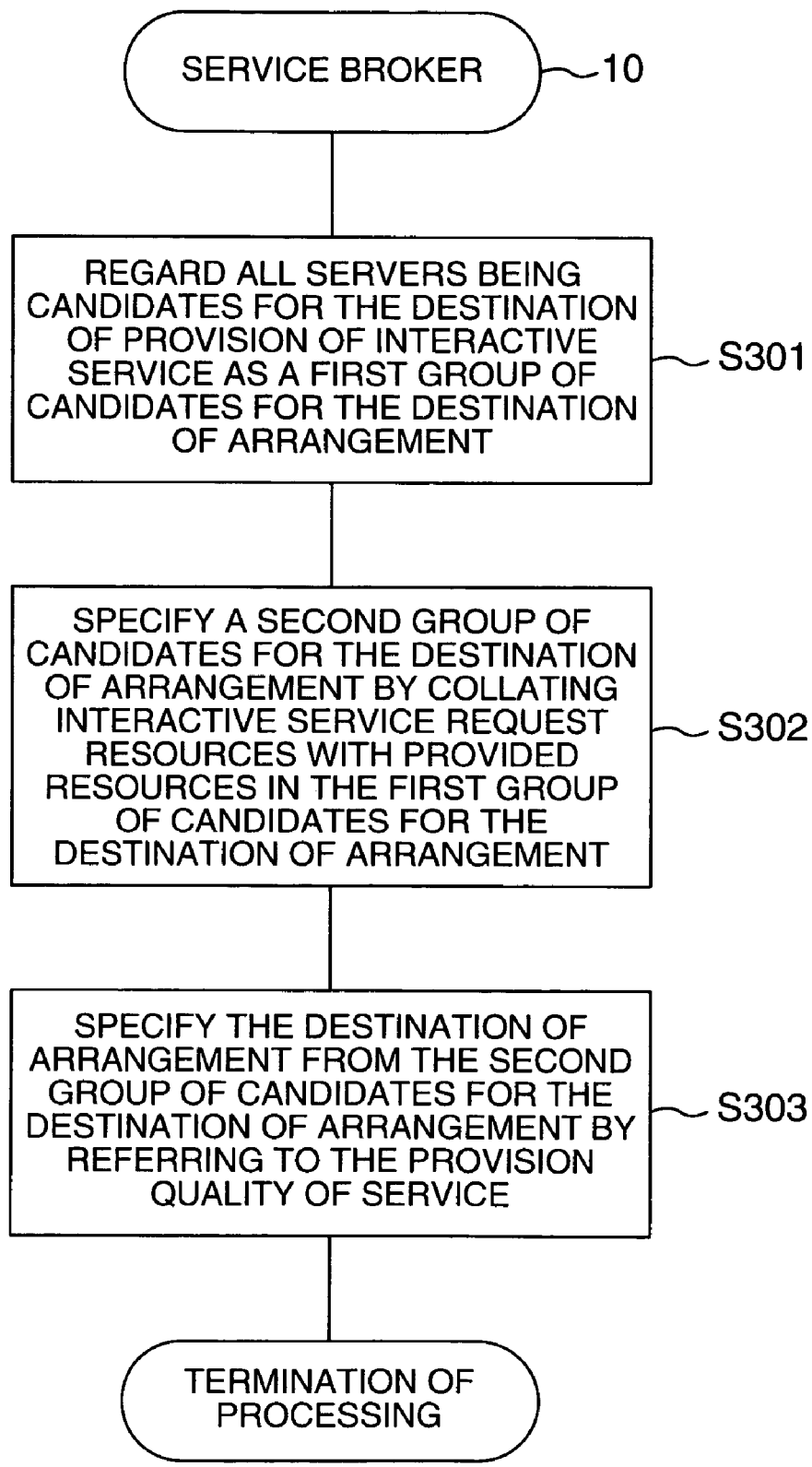
FIG. 9 is a flow chart showing a process of deciding a destination of allocation of interactive service according to an embodiment of the invention.

FIG. 9 is a flow chart showing a process of deciding the destination of allocation of interactive service. That is, FIG. 9 is a flow chart for explaining the step S103 or S204 in detail.

First, the service broker 10 regards all servers 20 being candidates for the destination of provision of interactive service as a first group of candidates for the destination of arrangement (S301). Incidentally, the service broker 10 has storage means in which all servers 20 being candidates for the destination of provision of interactive service are stored.

Then, the service broker 10 specifies a second group of candidates for the designation of arrangement by collating resources necessary for the interactive service with provided resources in the first group of candidates for the destination of arrangement (S302). That is, the service broker 10 checks all servers 20 providing resources adapted to request resources written in the request resource table 12 for the interactive service to be arranged, by referring to the provided resource table 22 of each server 20.

For example, the service broker 10 examines the program format executable on each server 20 from the provided resource table 22 and compares the program format with the execution program format in the request resource table 12 to thereby judge whether the program can be executed in each selected server 20. When the program is executable, the service broker 10 judges on the basis of the operating state of each selected server 20 in the provided source table 22 whether the selected server 20 is running or not. Even in the case where the selected server 20 is running, the service broker 10 compares allocatable throughput, allocatable memory capacity and allocatable disk capacity to thereby judge whether resources satisfying request throughput, request memory capacity and request disk capacity in the request resource table 12 are present in the provided resource table 22 for the selected server 20. When any one item does not satisfy the requirement, the service broker 10 makes a decision that no executable resource is provided.

Then, the service broker 10 specifies the destination of arrangement from the second group of candidates for the destination of arrangement by referring to the interactive service provision quality table 14 (S303). For example, a predetermined server 20 in which the provision quality of a predetermined interactive service is made best (shortest in terms of network waiting time, or largest in terms of network area) between the region where the client terminal 30 is located and the predetermined server 20 is specified as the destination of arrangement.

If the predetermined interactive service has been not executed yet between the server 20 as a subject of execution and the client terminal 30 as a subject of execution, there is a possibility that the provision quality of the interactive service cannot be specified. In this case, the provision quality between another client terminal 30 as a substitute for the client terminal 30 as a subject of execution and the server 20 as a subject of execution may be regarded as the provision quality concerning the client terminal 30 as a subject of execution. Incidentally, it is preferable that the other client terminal 30 is in an environment similar to that of the client terminal 30 as a subject of execution (e.g. the ranges where the two client terminals are located resemble each other, and the two client terminals use one and the same network). One client terminal need not be provided as the other client terminal 30. For example, the average or center value of provision quality data concerning a plurality of client terminals 30 may be used.

The invention described above may be modified widely without departing from the sprit of the invention as follows.

For example, the service broker 10 may instruct the server 20 to terminate the interactive service when the service provider gives an instruction to the service broker 10 to terminate the interactive service in a steady-state operating state. Then, the service broker 10 deletes a record corresponding to the terminated interactive service from the interactive service management table.

The service broker 10 may use a name server such as a DNS (Domain Name System) server as means for setting the server 20 as the destination of arrangement of the interactive service. That is, the service broker 10 may notify the client terminal 30 of the name of the server 20 as the destination of arrangement. In this case, the service broker 10 may register correspondence between the address of the server 20 as the destination of arrangement and the name of the server 20 as the destination of arrangement in the name server after specifying the server 20 as the destination of arrangement. In this modified example, the client terminal 30 can find the address of the server 20 as the destination of arrangement by inquiring of the name server while using the name of the server 20 of the destination of arrangement as a search key, so that the client terminal 30 can communicate with the server 20. Accordingly, the client terminal 30 can use the server 20 selected by the service broker 10 even in the case where the client terminal 30 is not specifically notified of the address of the server 20 to be connected.

Moreover, in this embodiment, various divisions concerning network characteristics (network distances on the Internet) or the like as well as the divisions concerning geographic positions (region A, region B and region C) where client terminals are located can be use as the divisions of the provision quality of interactive service. Accordingly, the invention is not limited by the contents of a specific division and the number of divisions.

Although this embodiment has been described on the case where each server 20 is constituted by one computer, this is only an assumption for making the description clear but not a limited item. For example, a server 20 constituted by a set of a plurality of computers may achieve one interactive service cooperatively.

Figure 10:
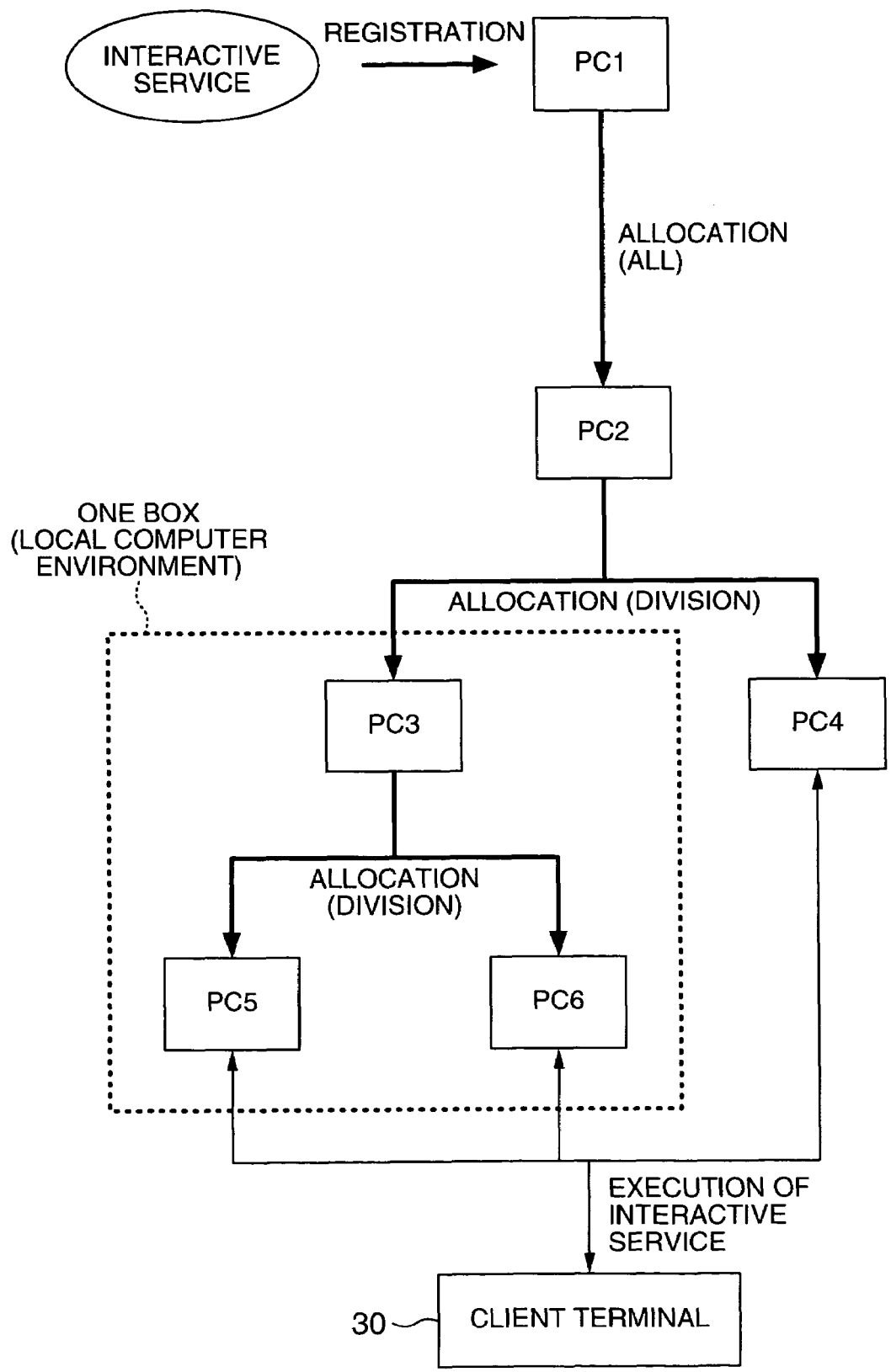
FIG. 10 is a diagram showing a state in which the process of allocating interactive service is repeated according to an embodiment of the invention.

Although this embodiment has been described on the case where one allocating process is carried out by the service broker 10 for allocating interactive service and the server 20 to which the interactive service will be allocated, a plurality of allocating processes may be carried out. For example, FIG. 10 is a diagram showing a state in which a process of allocating interactive service is repeated. The arrow direction in FIG. 10 indicates the process of allocating the interactive service from a source of allocation to a destination of allocation. In FIG. 10, after a predetermined interactive service is registered in PC1, a first allocating process (from PC1 to PC2), a second allocating process (from PC2 to PC3 and PC4) and a third allocating process (from PC3 to PC5 and PC6) are carried out successively. In each of the second and third allocating processes, the interactive service is allocated to a plurality of personal computers (PCs). This shows an event in which the task of the interactive service is divided so as to be allocated to the plurality of personal computers. For example, PC2 serves as the server 20 in the first allocating process but serves as the service broker 10 in the second allocating process.

As shown in FIG. 10, the service broker 10 as a source of allocation and the server 20 as a destination of allocation need not be stored in boxes separately. That is, the service broker 10 and the server 20 may be stored in one box, that is, may be provided in one local computer environment.

With respect to the timing of monitoring the provision quality, the interactive service provision quality monitoring portion 28 may monitor the provision quality at regular intervals (actively) or may monitor the provision quality (passively) when a monitor command is received from another apparatus. When a program for achieving a monitoring process is attendant on the monitor command, the program may be executed to monitor the provision quality.

The concept "fee" may be introduced into the case where the service broker 10 specifies the destination of arrangement of interactive service in S302. Specifically, each interactive service (provider) must pay the server 20 (administer) a fee for use of the server 20 by way of compensation for the server 20's execution of the interactive service. The allowable maximum amount of the fee is stored in the request resource table 12 so as to be associated with each interactive service. On the other hand, each server 20 defines the fee by way of compensation for provision of resources in the provided resource table 22.

Accordingly, when, for example, the allowable maximum amount of the fee for use of a predetermined information retrieval service is 1000 yen per hour, the service broker 10 operates so that servers 20 which are so cheap that the fee for use of each server 20 is not larger than 1000 yen per hour are selected as candidates for the destination of arrangement of the predetermined information retrieval service. Then, the service broker 10 operates so that a server 20 which is the cheapest in the fee for use is selected as the destination of arrangement of the predetermined information retrieval service from the servers 20 as the candidates which are so cheap that the fee for use of each server 20 is not larger than 1000 yen per hour.

When the concept "fee" is introduced into the process of selecting the destination of arrangement of service in the aforementioned manner, the same mechanism as the market principle in economics operates to adjust the fee to a level allowed to make an agreement between the service provider and the server 20.

According to the invention, a server for interactive service is specified on the basis of the provision quality of the interactive service between the server and the client terminal. Accordingly, the interactive service can be arranged in a server appropriate to an end user.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of arranging interactive service by an interactive service system including a service broker, servers, and client terminals, said service broker being provided for arranging said interactive service in said servers, said servers being provided for executing said interactive service for said client terminals, each of said service broker and said servers at least having a memory as a storage region used for performing an arithmetic process, and a processor for performing said arithmetic process, said method comprising the steps of:

executing a procedure by which said service broker accepts registration of said interactive service;

executing a procedure by which said service broker accepts a request from one of said client terminals to provide said interactive service;

executing a procedure by which said service broker selects servers allowed to provide resources requested by said interactive service as candidates for the destination of arrangement of said interactive service;

executing a procedure by which said service broker specifies a server as the destination of arrangement of said interactive service from said candidates for the destination of arrangement on the basis of the provision quality of said interactive service between each server and said client terminal;

executing a procedure by which said service broker arranges said interactive service stored in said memory, in said specified server;

executing a procedure by which a client terminal accepts said interactive service stored in said memory, in said specified server among said servers; and executing, after executing said procedure by which said service broker arranges said interactive service, a procedure by which said specified server divides the task of the interactive service thereby to allocate tasks divided by said specified server to a different server.

2. A method of arranging interactive service according to claim 1, wherein the provision quality of said interactive service is the communication quality of a network between each server and said client terminal.

3. A method of arranging interactive service according to claim 1, wherein the provision quality of said interactive service is calculated on the basis of the frequency in use of said interactive service between each server and said client terminal.

4. A method of arranging interactive service according to claim 1, further comprising the steps of:

executing a procedure by which said service broker receives a notification of the provision quality of said interactive service arranged by said service broker and being running between said service broker and said client terminal; and executing a procedure by which said service broker rearranges the arranged interactive service in another server than the server concerning said notification when the provision quality of said interactive service due to said notification does not satisfy a predetermined quality.

5. A method of arranging interactive service according to claim 1, wherein said procedure for selecting candidates for the destination of arrangement of said interactive service is a procedure by which servers are selected as candidates for the destination of arrangement so that a fee related to each of the servers is not larger than an allowable maximum fee related to said interactive service.

6. A method of arranging interactive service according to claim 1, wherein said procedure for arranging said interactive service stored in said memory, in said specified server is a procedure by which said service broker registers the address and name of said specified server in a corresponding name server.

7. A method of arranging interactive service according to claim 1, wherein said interactive service system is configured so that said service broker and said servers are stored in one box.

8. A program of arranging interactive service, wherein a method of arranging interactive service as defined in claim 1 is executed by a computer.

9. A recording medium in which a program defined in claim 8 is recorded so that said program can be read from said recording medium by a computer.

10. A method of arranging interactive service by an interactive service system including a service broker, servers, and client terminals, said service broker being provided for arranging said interactive service in said servers, said servers being provided for executing said interactive service for said client terminals, each of said service broker and said servers at least having a memory as a storage region used for performing an arithmetic process, and a processor for performing said arithmetic process, said method comprising the steps of:

executing a procedure by which said service broker accepts registration of said interactive service;

executing a procedure by which said service broker accepts a request from one of said client terminals to provide said interactive service;

executing a procedure by which said service broker selects servers allowed to provide resources requested by said interactive service as candidates for the destination of arrangement of said interactive service;

executing a procedure by which said service broker specifies a server as the destination of arrangement of said interactive service from said candidates for the destination of arrangement on the basis of the provision quality of said interactive service between each server and similar client terminals, when there are a plurality of similar client terminals located near to each other or using a same network, on the basis of average or center value of provision quality data concerning said plurality of similar client terminals;

executing a procedure by which said service broker arranges said interactive service stored in said memory, in said specified server; and executing a procedure by which a client terminal accepts said interactive service from a server among said servers.

* * * * *